US006455182B1

(12) United States Patent
Silver

(10) Patent No.: US 6,455,182 B1
(45) Date of Patent: Sep. 24, 2002

(54) SHIFT CONVERTER HAVING AN IMPROVED CATALYST COMPOSITION, AND METHOD FOR ITS USE

(75) Inventor: Ronald G. Silver, Tolland, CT (US)

(73) Assignee: UTC Fuel Cells, LLC, South Windsor, CT (US)

(*) Notice: Subject to any disclaimer, the term of this patent is extended or adjusted under 35 U.S.C. 154(b) by 0 days.

(21) Appl. No.: 09/852,333

(22) Filed: May 9, 2001

(51) Int. Cl.[7] .............................. C01B 3/16; H01M 8/04
(52) U.S. Cl. ...................... 429/17; 423/247; 423/437.2; 423/656
(58) Field of Search ................... 423/655, 656, 423/437.2, 247; 429/17

(56) References Cited

U.S. PATENT DOCUMENTS

| 3,825,501 A | | 7/1974 | Muenger | 252/373 |
|---|---|---|---|---|
| 4,021,366 A | | 5/1977 | Robin et al. | 252/373 |
| 4,170,573 A | | 10/1979 | Ernest et al. | 252/462 |
| 4,308,176 A | | 12/1981 | Kristiansen | 252/463 |
| 4,835,132 A | * | 5/1989 | Sambrook | 502/304 |
| 5,039,503 A | * | 8/1991 | Sauvion et al. | 423/656 |
| 5,073,532 A | | 12/1991 | Domesle et al. | 502/304 |
| 5,464,606 A | | 11/1995 | Buswell et al. | 423/655 |
| 5,830,425 A | * | 11/1998 | Schneider et al. | 423/656 |
| 5,990,040 A | * | 11/1999 | Hu et al. | 423/656 |
| 6,033,634 A | | 3/2000 | Koga | 422/198 |
| 6,040,265 A | | 3/2000 | Nunan | 502/242 |
| 6,120,925 A | * | 9/2000 | Kawatsu et al. | 429/17 |

FOREIGN PATENT DOCUMENTS

WO    WO 97/44123    11/1997

OTHER PUBLICATIONS

A. Martinez–Arias, et al, "EPR study on oxygen handling properties of ceria, zirconia and Zr–Ce (1:1) mixed oxide samples", Catalysis Letters, 65 (2000), pp. 197–204, (no month).
T. Bunluesin, et al, "Studies of the water–gas–shift reaction on ceria– supported Pt, Pd, and Rh: implications for oxygen storage properties", Applied Catalysis, (B Environmental), (1998), pp. 107–114, (no month).

* cited by examiner

Primary Examiner—Wayne A. Langel
(74) Attorney, Agent, or Firm—Stephen A. Schneeberger

(57) ABSTRACT

A shift converter (16) in a fuel processing subsystem (14, 16, 18) for a fuel cell (12) uses an improved catalyst composition (50) to reduce the amount of carbon monoxide in a process gas for the fuel cell (12). The catalyst composition (50) is a noble metal catalyst having a promoted support of mixed metal oxide, including at least both ceria and zirconia. Cerium is present in the range of 30 to 50 mole %, and zirconium is present in the range of 70 to 50 mole %. Additional metal oxides may also be present. Use of the catalyst composition (50) obviates the requirement for prior reducing of catalysts, and minimizes the need to protect the catalyst from oxygen during operation and/or shutdown.

3 Claims, 2 Drawing Sheets

SHIFT CONVERTER HAVING AN IMPROVED CATALYST COMPOSITION, AND METHOD FOR ITS USE

TECHNICAL FIELD

This invention relates to hydrocarbon fuel processing, and more particularly to an improved shift converter and the catalysts used therein. More particularly still, the invention relates to improved catalyst compositions in, and used in, shift converters for processing hydrogen-rich gas streams, as for use in fuel cells.

BACKGROUND ART

Fuel cell power plants that utilize a fuel cell stack for producing electricity from a hydrocarbon fuel are well known. In order for the hydrocarbon fuel to be useful in the fuel cell stack's operation, it must first be converted to a hydrogen-rich stream. Hydrocarbon fuels that are used by the fuel cell stack pass through a reforming process to create a process gas having an increased hydrogen content that is introduced into the fuel cell stack. The resultant process gas contains, primarily, water, hydrogen, carbon dioxide, and carbon monoxide. The process gas has about 10% carbon monoxide (CO) upon exit from the reformer.

Anode electrodes, which form part of the fuel cell stack, can be "poisoned" by a high level of carbon monoxide. Thus, it is necessary to reduce the level of CO in the process gas, prior to flowing the process gas to the fuel cell stack. This is typically done by passing the process gas through a shift converter, and possibly additional reactors, such as a selective oxidizer, prior to flowing the process gas to the fuel cell stack. The shift converter also increases the yield of hydrogen in the process gas.

Shift converters for reducing the CO content of process gas are well known, and typically comprise a chamber having an inlet for entry of the process gas into the chamber, an outlet downstream of the inlet for exit of effluent from the chamber, and a catalytic reaction zone between the inlet and the outlet. The catalytic reaction zone typically contains a catalyst, or catalyst composition, for converting at least a portion of the carbon monoxide in the process gas into carbon dioxide. In operation a shift converter carries out an exothermic shift conversion reaction represented by the following equation:

$$CO + H_2O \rightarrow CO_2 + H_2 \qquad (1)$$

The reaction (1) between the CO and water concurrently reduces the CO content and increases the $CO_2$ and $H_2$ content of the process gas. The generation of additional hydrogen from this reaction is advantageous to the power plant inasmuch as hydrogen is consumed at the fuel cell anode to produce power. A discussion of one such shift converter is contained in PCT Application US97/08334 for "Shift Converter", published on Nov. 27, 1997 as WO 97/44123. In the shift converter of that application, a catalyst bed contains a catalyst composition of copper and zinc oxide, or copper, zinc oxide, and alumina. Such catalyst composition is further disclosed in U. S. Pat. No. 4,308,176 to Kristiansen, and has been used for a number of years to promote the shift reaction in the shift converters associated with fuel cell power plants. However, reactors using these catalyst compositions have the limitation that they must be purged with a flow of hydrogen to initially reduce them, and steps must be taken subsequent to operation to prevent significant oxidation or exposure to oxygen. In fact, the required reaction does not work, or occur, unless the catalyst is reduced. Exposure of these catalyst compositions to oxygen is, or may be, detrimental to the catalyst. This is because the catalyst is self-heating in the presence of oxygen, and it can easily heat itself to the point where catalyst particles will sinter, and thus lose surface area and decrease activity. This need to provide a reducing atmosphere and to minimize the possibility of oxygen leaks to the catalyst with a special shutdown purge and the maintenance of an inert atmosphere during shutdown, results in additional hardware and process control considerations that add to the complexity and cost of the fuel cell power plant system, particularly with regard to the shift converter.

Recent studies show that cerium oxide, or "ceria" ($CeO_2$), can be used in combination with a noble metal to promote the shift reaction and to eliminate the requirement that the catalyst be reduced. The combination of ceria and platinum provide a catalyst that is more oxygen tolerant than the prior catalysts. However, such ceria-promoted platinum catalysts have not demonstrated sufficient activity for the shift reaction to be useful in a reactor of a reasonable size. Rather, an unreasonably large catalyst bed would be required, particularly for mobile fuel cell power plants. Moreover, water levels typical of water-gas shift reactions may promote sintering of the ceria support.

It is thus an object of the present invention to provide a shift converter having an improved catalyst composition for efficiently converting carbon monoxide to carbon dioxide and hydrogen using a water-gas shift reaction without the need for special catalyst reconditioning.

It is a further object to provide and use an improved catalyst composition having increased activity in a shift conversion reactor for converting carbon monoxide to carbon dioxide and hydrogen using a water-gas-shift reaction without the need to protect the catalyst from exposure to air.

It is a still further object of the invention to provide and use an improved catalyst composition providing improved activity and durability over existing noble metal catalysts for the water-gas-shift reaction.

DISCLOSURE OF INVENTION

A shift converter for reducing the amount of carbon monoxide in a process gas, as for a fuel cell power plant, uses an improved catalyst composition in accordance with the invention. The shift converter includes an inlet for entry of the process gas, an outlet downstream of the inlet for exit of effluent from the chamber, and a catalytic reaction zone between the inlet and outlet. The catalyst composition of the invention resides in the catalytic reaction zone of the shift reactor and is active to convert at least a portion of the carbon monoxide and water in the process gas into carbon dioxide and hydrogen. The operation of the shift reactor with the improved catalyst composition obviates the prior requirements for pre-reducing the catalyst, providing a special post-shutdown purge, and maintaining an inert atmosphere during shutdown.

The improved catalyst composition used in the shift converter comprises a noble metal catalyst having a promoted support, which promoted support comprises a mixed metal oxide of at least cerium oxide (ceria) and zirconium oxide (zirconia). The inclusion of the zirconia with the ceria promoter increases the number of oxygen vacancies, and thus the composition's activity. Moreover, the zirconia increases the resistance of ceria to sintering, thereby improving the durability of the catalyst composition. The mixed metal oxides, in addition to the ceria and zirconia, may include a third metal oxide, selected from the group consisting of praseodymium oxide, lanthanum oxide, neodymium oxide, and hafnium oxide, to form a ternary mix of the metal oxides. Additionally, alumina may be added to the catalyst composition, particularly if the latter is in the powder form, to improve its suitability for washcoating onto a supporting substrate.

The noble metal catalyst on the promoted support is selected from the metals of groups VIIb, VIII, and Ib of the second and third transition series of the periodic table, with platinum, palladium, rhodium, and gold being generally preferred, and platinum being particularly preferred.

The invention further includes the method of removing carbon monoxide from a process fuel gas for a fuel cell via the utilization of a shift converter which employs the improved catalyst composition.

The foregoing and other features and advantages of the present invention will become more apparent in light of the following detailed description of exemplary embodiments thereof as illustrated in the accompanying drawings.

BEST MODE FOR CARRYING OUT THE INVENTION

Figure 1:
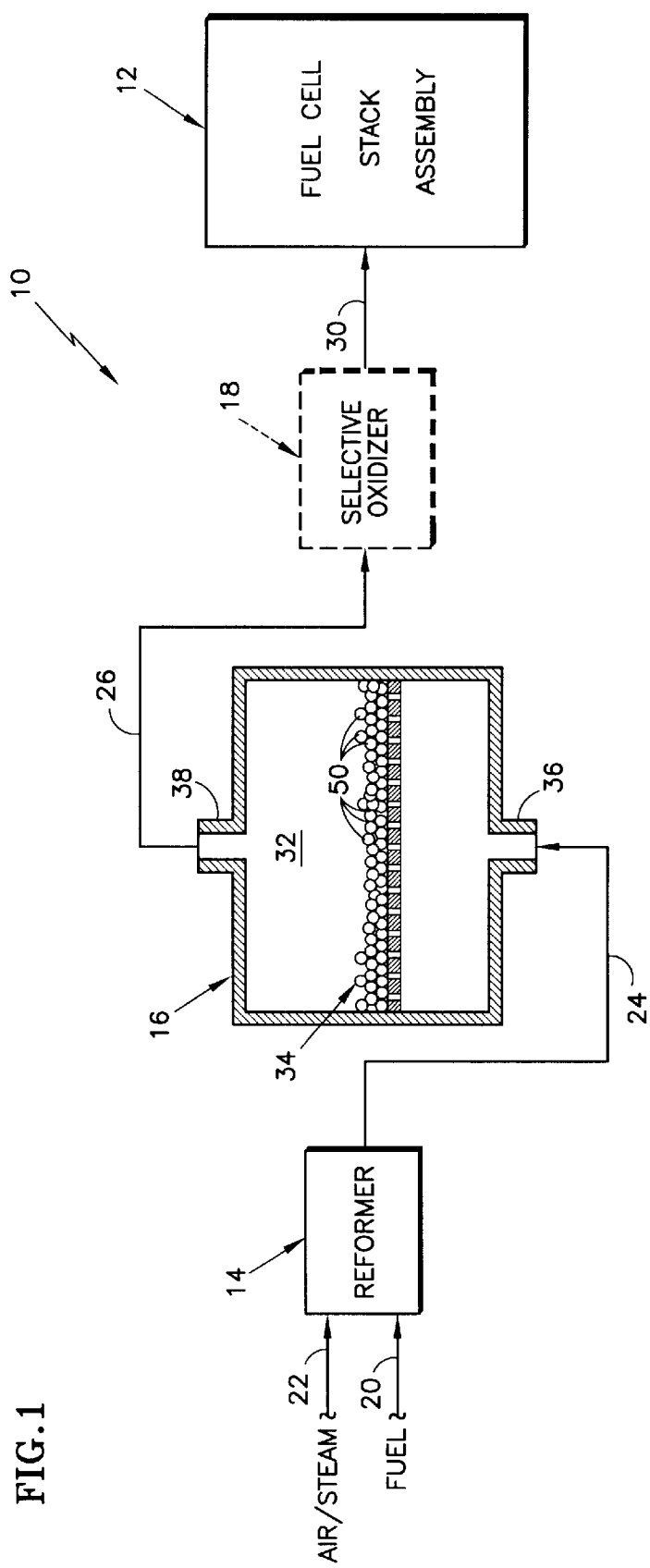
FIG. 1 is a simplified functional schematic diagram of a representative fuel cell power plant, depicting a shift converter employing the improved catalyst composition in accordance with the invention.

Referring to FIG. 1, there is depicted in functional schematic form, a fuel cell power plant 10. The power plant 10 includes a fuel cell stack assembly 12 of conventional design and construction, and a fuel processing subsystem which includes a reformer 14, a shift converter 16 and an optional selective oxidizer 18. The fuel processor converts a hydrocarbon fuel source into a hydrogen-rich stream of fuel which is supplied as the fuel to the fuel cell stack assembly 12. Typically, the hydrocarbon fuel source is a liquid, such as gasoline, or a gas, such as methane, natural gas, or the like, and is supplied to the Fuel inlet 20 of reformer 14. Air and/or steam is supplied to the Air/Steam inlet 22 of reformer 14. The reformer 14 reacts hydrocarbon fuel and steam and/or air to reform the hydrocarbon (and steam) to yield hydrogen ($H_2$), carbon monoxide (CO), carbon dioxide ($CO_2$), and residual steam/water ($H_{2O}$), in a well known manner. However, to further reduce or minimize the presence of carbon monoxide (CO) which otherwise "poisons" the anodes of the fuel cell stack assembly, and to increase the yield of hydrogen in the hydrogen-rich fuel source for the fuel stack assembly 12, the effluent process gas from the reformer 14 is conducted, via conduit 24, to the shift converter 16, where it is processed to reform the carbon monoxide to carbon dioxide.

The shift converter 16 carries out an exothermic shift reaction as noted in the formula (1) expressed in the Background Art above. The desired reaction in the shift reactor 16 is the conversion of carbon monoxide and water to carbon dioxide and hydrogen. To the extent necessary, an optional selective oxidizer 18 may also be provided, and receives effluent process gas from the shift reactor 16 via conduit 26, to further convert carbon monoxide to carbon dioxide through the addition of air ($O_2$). The resultant effluent gas stream is sufficiently rich in hydrogen and depleted of carbon monoxide to meet the needs of the fuel cell stack assembly 12, and is extended thereto via conduit 30.

The shift converter 16 includes a housing having a catalyst chamber 32 containing one or more catalyst beds or functionally equivalent structures, 34, for promoting the desired shift reaction. The process gas from the reformer 14 enters the shift reactor 16 at inlet 36, flows through and across the catalyst bed(s) 34 in the catalyst chamber 32, and exits via outlet 38. Each catalyst bed 34 contains a catalyst composition, or simply, catalyst, 50, formulated particularly for improving the performance of the shift reactor 16 in accordance with the invention. Although the catalyst 50 is depicted here as a bed within the catalyst chamber 32, it will be appreciated, that other arrangements for supporting the catalyst 50 within the catalyst chamber 32 are well known and are contemplated as alternatives. For instance, a preferred arrangement may be that of a honeycomb-type structure of ceramic, alumina, cordierite (alumina/magnesia/silica), or the like, mounted in the catalyst chamber 32 and containing the catalyst as a coating thereon.

The catalyst 50 is a formulation of a noble metal on a promoted support of mixed metal oxides, in which at least two of the metal oxides include cerium oxide, or ceria, ($CeO_2$) and zirconium oxide, or zirconia, ($ZrO_2$). The literature suggests that ceria acts to promote noble metal catalysts for the water-gas shift reaction, by serving as a source of oxygen vacancies. Increasing the oxygen vacancies is thought to correspond to an improved water-gas shift reaction rate. Importantly, the addition of one or more additional metal oxides, of which an essential one is zirconia, to the ceria to create a mixed metal oxide promoted support (i. e., the support is a promoter) for the noble metal has been found to give the resulting catalyst composition 50 improved resistance to sintering at the higher operating temperatures (400–700° F.) of the shift converter 16, as well as to further enhance the number of oxygen vacancies of the promoted catalyst.

The ceria and the zirconia are present in the catalyst composition in relation to one another in the range of about 50.0 to 30.0 mole % (mole per cent) zirconium to 50.0 to 70.0 mole % (mole per cent) cerium. A third metal oxide may be present in the range of 0.0 to 10.0 mole % of the total oxide. The noble metal is in the range of 0.1 to 2.0 mole %, with 0.3 mole % being the value in a representative example. The quantity of zirconium should not be less than 30.0% in order to assure the enhanced stability it provides to the catalyst 50, nor should it be greater than 50.0% in order to prevent phases in the system which are only zirconia and/or only ceria.

An exemplary formulation of and for the catalyst composition 50 for shift reactor 16 is provided in the following Example, in which the MEI 01023 pellet material is a metal oxide mix of ceria and zirconia, and serves as the catalyst support for the noble metal catalyst. The noble metal catalyst is platinum. The ceria is present in the pellet in the amount of 58 mole % Ce, and the zirconia is present in the amount of 42 mole % Zr. The MEI 01023 is available from Magnesium Elektron Inc. of Flemington, New Jersey. The promoted support material, MEI 01023, of ceria and zirconia, was provided in the form of small pellets of 1/16 inch diameter, but might also have been provided as a powder or the like. The following Example uses the method of incipient wetness to apply the platinum to the supports. Other methods of adding the noble metal are well known.

EXAMPLE

| | |
|---|---|
| Support | 36.600 g pellets (50 cc) |
| Pore volume | 0.700 g water/g catalyst |
| Amount of solution | 25.620 g liquid solution containing Pt (see below) fills all the pores of the pellets |
| Amount of Pt Diamminodinitrite - 61% | |
| Pt (labeled) Pt Solution | 0.247    Pt/Pt $(NH_3)_2(NO_3)_2$ |
| Pt $(NH_3)_2(NO_2)_2$ | 0.247 |
| DI water | 15.372 |
| Nitric Acid | 10.248 |

Steps:
1. Weigh out and dry the pellet support (MEI 01023) for 2 hours at 100° C.
2. Dissolve Pt $(NH_3)_{2(NO2)_2}$ in 10.248 ml concentrated nitric acid as indicated, stirring constantly.
3. Once Pt dissolved, add Pt acid solution to the DI water.
4. Pour resulting solution over dried pellets, then stir with glass or Teflon® stirrer until support is uniformly coated.
5. Dry resulting mixture for 1h at 100° C., then calcine 4h at 400° C.
6. Weigh dried and calcined mixture to assure/determine complete mass balance.

This formulation uses pellets of the ceria and zirconia, and coats it with the platinum. The resulting dried and calcined mixture represents the catalyst composition 50.

Alternatively, powders of the mixed metal oxide may be wash-coated onto an appropriate supporting substrate of alumina or-cordierite, or such, and then the platinum can be applied to the wash-coated support in a manner s similar to the preparation of the pellets. Further, it may be desirable to add alumina to the powder to improve its suitability for wash-coating onto a supporting substrate. The alumina facilitates the adhesion of the wash-coat to the supporting substrate.

Figure 2:
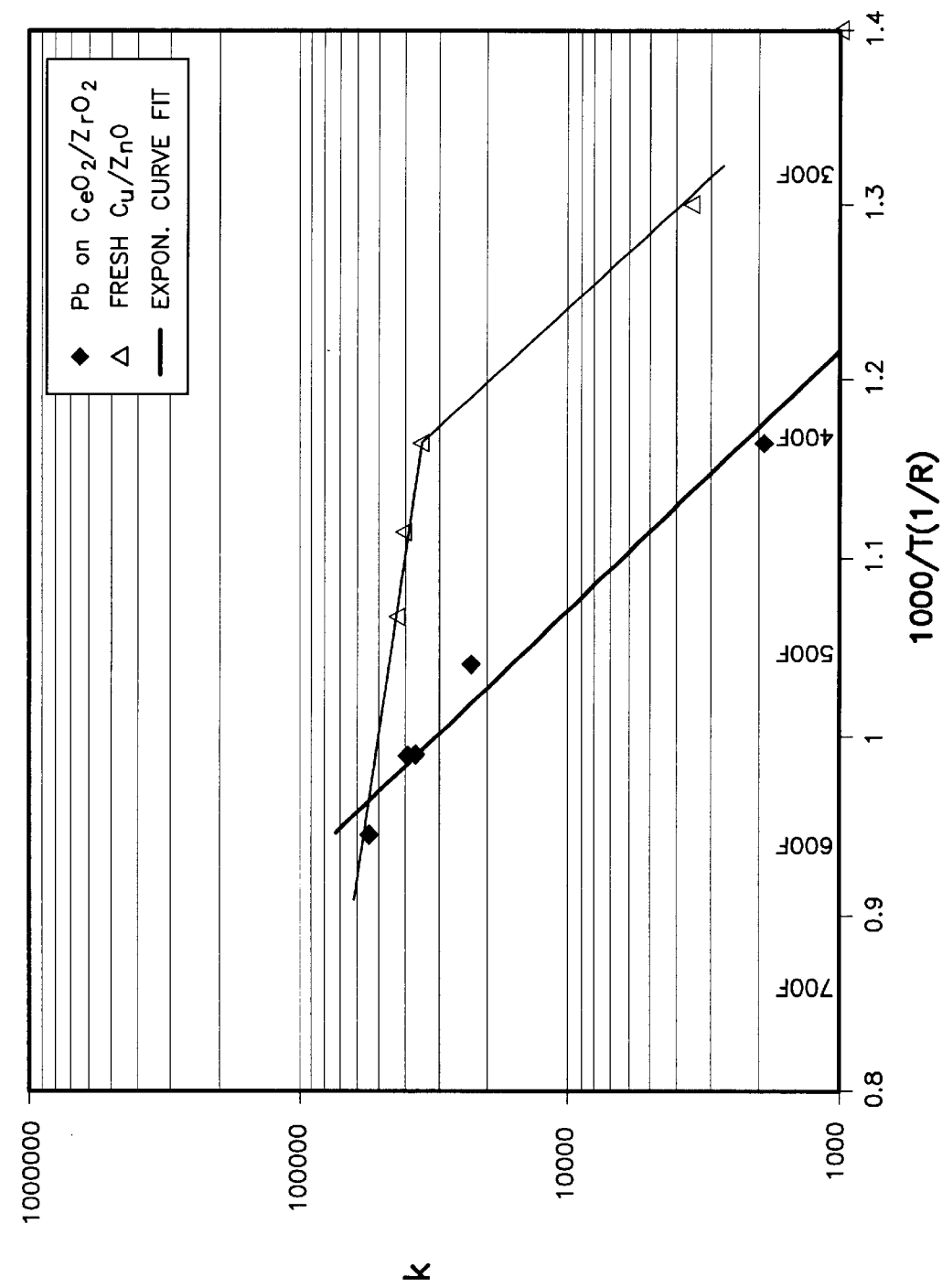
FIG. 2 is a graph depicting plots of the shift conversion activity of the improved catalyst of the invention vs. that of the Cu/ZnO catalyst previously used.

FIG. 2 is an Arrhenius plot showing the shift conversion activity of catalyst composition 50, prepared in accordance with the Example above, in graphic comparison with that of pellets of copper/zinc oxide catalyst of the type previously used as the catalyst in shift reactors for this water-gas shift reaction. The parameter measured logarithmically along the y-axis is a reaction rate constant, k, at a given temperature, for the water-gas shift reaction. The parameter measured linearly along the x-axis is the inverse of the temperature at which reactivity is measured, or 1000/T It is seen that the Cu/ZnO of the prior art increases the reaction rate at a $1^{st}$ slope as the temperature increases from 300° F. to about 400° F. and there after at a much lower $2^{nd}$ slope as the temperature increases further from 400° F. to about 600° F. However, it will be noted that the Pt on $CeO_2/ZrO_2$ catalyst of the invention increases its reaction rate at a substantially constant slope, comparable to the $1^{st}$ slope above, as the temperature increases from about 380° F. to 600° F. It will be observed that at the cross-over region of about 580° to 600° F., the catalyst composition of the invention exhibits activity that is equivalent to the activity of the Cu/ZnO. Thus, for such level of activity, a reactor utilizing the noble metal catalyst 50 of the invention would be approximately the same size as a reactor using the conventional Cu/ZnO catalyst, yet would not require the additional cost, volume, and complexity of the reducing/purging/inerting system(s) presently associated with the latter.

Although zirconia is the second metal oxide in the mix with ceria, further advantages, such as lower overall cost, may be derived by including a third metal oxide in a ternary mix of such oxides. The third metal oxide may conveniently be selected from the group consisting of praseodymium oxide, lanthanum oxide, neodymium oxide, and hafnium oxide. The addition of one or more of these metal oxides serves to assist $ZrO_2$ in its stabilization and promotion of ceria.

The noble metal, or metals, that comprise(s) the catalyst supported by the mixed metal oxides of at least ceria and zirconia, is/are selected from the metals of groups VIIb, VIII, and Ib of the second and third transition series of the periodic table. That group of noble metals includes rhenium, platinum, palladium, rhodium, ruthenium, osmium, iridium, silver, and gold. Platinum, palladium, rhodium, and/or gold, alone or in combination, are generally preferred, and platinum is the noble metal that is particularly preferred. Platinum is preferred because it provides the level of activity required to obtain the desired reaction rate in a reactor of reasonable size/volume.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. The method of reducing the amount of carbon monoxide in a process fuel gas, comprising the steps of:

a. placing a catalyst composition (50) of a noble metal catalyst having a promoted support into a shift converter (16), the promoted support comprising a mixed metal oxide of at least cerium oxide and zirconium oxide; and b. passing the process fuel gas into operative proximity with the catalyst composition (50) to convert at least a portion of the carbon monoxide in the process fuel gas into carbon dioxide and hydrogen via a water-gas shift reaction.

2. The method of claim 1 wherein the catalyst composition (50) obviates any requirement for prereduction, a shutdown purge, or an inerting atmosphere, in association with the operation of the shift converter (16).

3. The method of claim 1, wherein the reduction of carbon monoxide in a fuel gas is for a fuel cell (12).

\* \* \* \* \*